(12) United States Patent
Cho et al.

(10) Patent No.: US 9,588,352 B2
(45) Date of Patent: Mar. 7, 2017

(54) AUTOSTEREOSCOPIC IMAGE DISPLAY DEVICE WITH A DIFFERENCE IMAGE MAP

(71) Applicant: SAMSUNG DISPLAY CO., LTD., Yongin, Gyeonggi-Do (KR)

(72) Inventors: Jung-Hyun Cho, Seoul (KR); Seung Jun Yu, Cheonan-si (KR)

(73) Assignee: SAMSUNG DISPLAY CO., LTD., Giheung-Gu, Yongin (KR)

( * ) Notice: Subject to any disclaimer, the term of this patent is extended or adjusted under 35 U.S.C. 154(b) by 0 days.

(21) Appl. No.: 14/828,308

(22) Filed: Aug. 17, 2015

(65) Prior Publication Data

US 2016/0212415 A1    Jul. 21, 2016

(30) Foreign Application Priority Data

Jan. 19, 2015 (KR) .................. 10-2015-0008879

(51) Int. Cl.
*G02F 1/1335* (2006.01)
*G02B 27/22* (2006.01)
*H04N 13/04* (2006.01)
*H04N 13/00* (2006.01)

(52) U.S. Cl.
CPC ..... *G02B 27/2214* (2013.01); *H04N 13/0409* (2013.01); *H04N 13/0413* (2013.01); *H04N 13/0456* (2013.01); *H04N 2013/0074* (2013.01)

(58) Field of Classification Search
CPC .......... G02B 27/2214; H04N 13/0409; H04N 13/0456; H04N 13/0413; H04N 2013/0074
See application file for complete search history.

(56) References Cited

U.S. PATENT DOCUMENTS

| | | | |
|---|---|---|---|
| 6,246,451 B1 * | 6/2001 | Matsumura | G02B 27/2214 348/59 |
| 2003/0142068 A1 | 7/2003 | DeLuca et al. | |
| 2006/0082520 A1 * | 4/2006 | Otte | G02B 27/2214 345/32 |
| 2011/0157257 A1 * | 6/2011 | Bennett | G06F 3/14 345/690 |

(Continued)

FOREIGN PATENT DOCUMENTS

| KR | 1020120095424 | 8/2012 |
|---|---|---|
| KR | 1020130027932 | 3/2013 |
| KR | 1020130063372 | 6/2013 |

*Primary Examiner* — Donald Raleigh
(74) *Attorney, Agent, or Firm* — F. Chau & Associates, LLC

(57) ABSTRACT

A display device includes a light blocking panel; a transparent display panel; a three-dimensional (3D) panel; a mask generating unit that generates a first mask from a difference between a left eye image and a right eye image that indicates whether or not viewpoint disparity is generated in each block of the 3D panel, and a second mask indicating whether each block of the light blocking panel is transparent or opaque; and an image processing unit that generates the display image from the left and right eye images and the first mask, wherein the display image is divided into a first region first region that includes an interlaced image generated by alternately arranging left eye image pixels and right eye image pixels, and a second region that includes a 2D image generated from one or both of the left eye image and the right eye image.

20 Claims, 12 Drawing Sheets

(56) References Cited

U.S. PATENT DOCUMENTS

| | | | | |
|---|---|---|---|---|
| 2012/0056879 A1* | 3/2012 | Song | .................. | H04N 13/0404 345/419 |
| 2012/0140131 A1* | 6/2012 | Lanman | ............. | G02B 27/2214 349/15 |
| 2012/0257815 A1* | 10/2012 | Schlosser | ........... | H04N 13/0037 382/154 |
| 2013/0128019 A1* | 5/2013 | Tajima | ................ | G02B 27/2214 348/59 |
| 2013/0141423 A1* | 6/2013 | Cho | .................. | G02B 27/2264 345/419 |
| 2013/0250064 A1* | 9/2013 | Suh | .................... | H04N 5/23245 348/46 |
| 2013/0258446 A1* | 10/2013 | Tatsuta | .................... | G02B 26/02 359/291 |
| 2013/0335648 A1* | 12/2013 | Kuroda | .................. | G09G 3/003 349/15 |
| 2014/0036045 A1* | 2/2014 | Ishikawa | ............ | H04N 13/0409 348/51 |
| 2014/0055564 A1* | 2/2014 | Cho | .................. | H04N 13/0018 348/46 |
| 2014/0118336 A1* | 5/2014 | Smithwick | ......... | G02B 27/2214 345/419 |
| 2014/0253695 A1* | 9/2014 | Kassouf | ............ | G02B 27/2214 348/51 |
| 2014/0268324 A1* | 9/2014 | Rosenthal | .......... | G02B 27/2214 359/462 |
| 2016/0078620 A1* | 3/2016 | Iwanaka | .............. | H04N 13/021 600/424 |
| 2016/0139422 A1* | 5/2016 | Sumi | .................. | G02B 27/2214 349/15 |
| 2016/0286206 A1* | 9/2016 | Yoshino | ............. | G02B 27/2214 |

\* cited by examiner

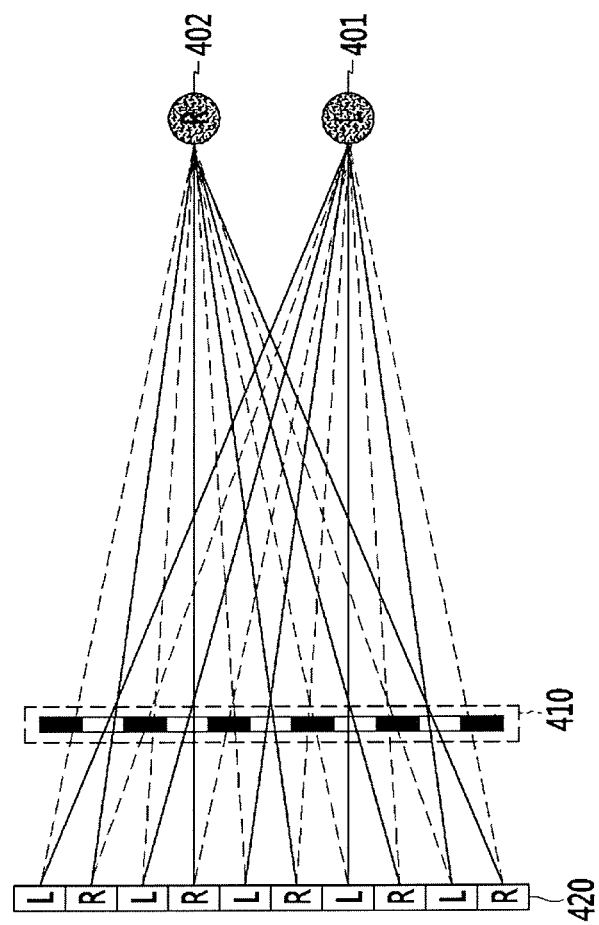

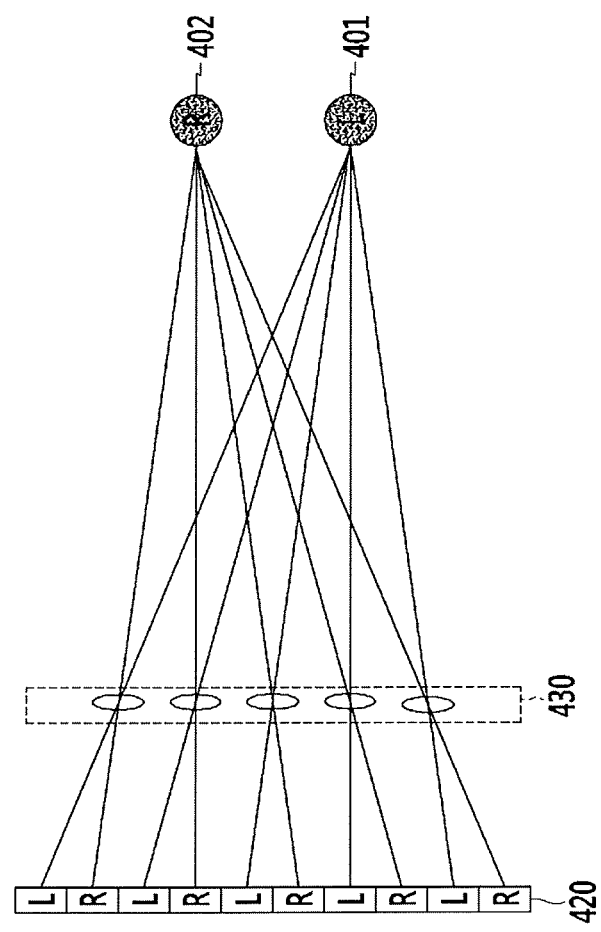

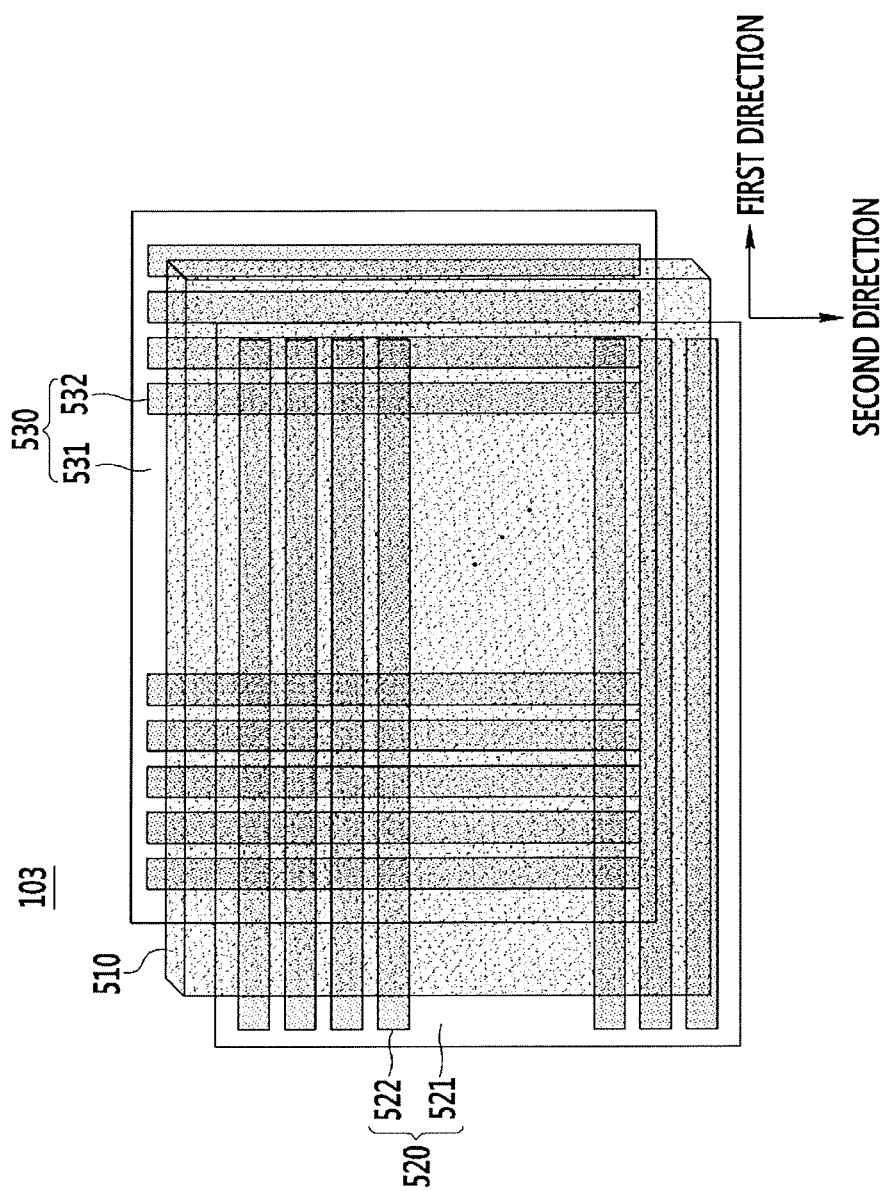

AUTOSTEREOSCOPIC IMAGE DISPLAY DEVICE WITH A DIFFERENCE IMAGE MAP

CROSS-REFERENCE TO RELATED APPLICATION

This application claims priority under 35 U.S.C. §119 from Korean Patent Application No. 10-2015-0008879 filed in the Korean Intellectual Property Office on Jan. 19, 2015, and all the benefits accruing therefrom, the contents of which are herein incorporated by reference in their entirety.

BACKGROUND (a) Technical Field

Embodiments of the present disclosure are directed to a display device and, more particularly, to a display device outputting a partial 3D image.

(b) Discussion of the Related Art

Human beings can see objects three-dimensionally due to binocular disparity. Binocular disparity refers to the difference in image location of an object seen by the human beings' left and right eyes. When an image seen through the left eye and an image seen through the right eye are combined in a person's brain, the combined image is perceived as a three dimensional (3D) image. Three-dimensional (3D) video display devices that can apply such binocular disparity have been actively studied.

A 3D image display method based on binocular disparity may be classified as a stereoscopic image display scheme that requires a user to wear special glasses and an auto-stereoscopic image display scheme that does not requiring glasses. Stereoscopic image display schemes include using colored glasses having wavelength selectivity, polarizing glasses using a light blocking effect based on a polarization difference, a time division glass scheme of alternately presenting left and right images within a residual image time of the eyes, etc. In addition, according to another scheme, filters having different transmittances for the left and right eyes may be respectively placed in front of the left and right eyes. In this scheme, an object moving in a horizontal direction may be perceived in 3D due to time differences resulting from the transmittance differences.

In an auto-stereoscopic image display scheme, a 3D effect is generated on an image display plane side, rather than on a viewer side. Auto-stereoscopic image display schemes include a parallax barrier scheme, a lenticular scheme, a microlens array scheme, etc.

When an auto-stereoscopic 3D image display technique is applied to a transparent display device, a background image, rather than a 3D object, may become visible upon being distorted by the parallax barrier, lens array, etc., used to realize a 3D image.

SUMMARY

Embodiments of the present disclosure can enhance visibility of a 3D object without distorting a background image in a transparent display device displaying a 3D image.

An exemplary embodiment of the present disclosure provides a display device including: a light blocking panel having an adjustable transparency and configured to block light or allow light to pass therethrough; a transparent display panel disposed on the light blocking panel and configured to output a display image; a three-dimensional (3D) panel disposed on the transparent display panel and configured generate viewpoint disparity to generate a 3D effect in at least a portion of the display image, wherein the light blocking panel and the 3D panel are each organized into a plurality of blocks corresponding one or more pixels; a mask generating unit configured to generate a first mask from a difference image map generated from a left eye image and a right eye image that indicates whether or not viewpoint disparity is generated in each block of the 3D panel, and to generate a second mask from the first mask that indicates whether each block of the light blocking panel is transparent or opaque; an image processing unit configured to generate the display image from the left eye image, the right eye image and the first mask, wherein the display image is divided into a first region and a second region on the basis of the first mask, wherein the first region includes an interlaced image generated by alternately arranging left eye image pixels and right eye image pixels, and the second region includes a 2D image generated from one or both of the left eye image and the right eye image Another exemplary embodiment of the present disclosure provides a method of controlling a display device, including receiving a left eye image and a right eye image; generating a difference image map from the received left eye image and the right eye by calculating a difference between corresponding pixel values of the left eye image and the right eye image; generating a 3D mask for a 3D panel from the difference image map, wherein the 3D mask is a matrix of numerical values, each indicating activation/deactivation of an element of the 3D panel for generating viewpoint disparity in each block of the 3D panel; generating a blocking mask for the light blocking panel from the difference image map, wherein the blocking mask is a matrix of numerical values, each indicating a transparency or opaqueness in each block of a light blocking panel; generating a display image from the left eye image, the right eye image, and the 3D mask by generating an interlaced image portion in a 3D display region of the display image in which left eye image pixels and right eye image pixels are alternately arranged, and generating a non-interlaced 2D image in a 2D display region of the display image, and outputting the generated display image through a display panel; and driving the 3D panel and the light blocking panel based on the 3D mask and the blocking mask wherein the 3D panel converts the interlaced image portion in the display image into a 3D image and the light blocking panel converts the non-interlaced 2D image of the display image to be opaque.

Another exemplary embodiment of the present disclosure provides a display device, including a light blocking panel having an adjustable transparency and configured to block light or allow light to pass therethrough; a three-dimensional (3D) panel disposed on the transparent display panel and configured to viewpoint disparity to generate a 3D effect in at least a portion of a display image, wherein the light blocking panel and the 3D panel are each organized into a plurality of blocks corresponding one or more pixels; a difference image map generating unit configured to generate a difference image map from differences between corresponding pixel values of a left eye image and a right eye image; a mask generating unit configured to generate a first mask from the difference image map that indicates whether or not viewpoint disparity is generated in each block of the 3D panel, and to generate a second mask from the first mask that indicates whether each block of the light blocking panel is transparent or opaque; and an image processing unit configured to generate the display image from the left eye image, the right eye image and the first mask, wherein the display image is divided into a first region and a second region on the basis of the first mask, the first region includes an interlaced image generated by alternately arranging left eye image pixels and right eye image pixels, and the second region includes a 2D image generated from one or both of the left eye image and the right eye image.

According to embodiments of the present disclosure, since stereoscopic vision is generated only in a region in which a 3D object is displayed, an image of other region is prevented from being distorted by the 3D panel. Also, since a viewpoint disparity generation region is a portion of the image, rather than an entire image, luminance reduction due a viewpoint disparity generation may be reduced, and power consumption for compensating for luminance may be reduced.

A background of a region of the display panel in which a 3D object is displayed may adjusted to be opaque so that the 3D object is more visibly highlighted.

BRIEF DESCRIPTION OF THE DRAWINGS

FIGS. 4A and 4B illustrate a method of implementing stereoscopic vision in a 3D panel according to an exemplary embodiment of the present disclosure.

FIG. 5 illustrates a case in which a 3D panel is a parallax barrier as an example according to an exemplary embodiment of the present disclosure.

DETAILED DESCRIPTION OF THE EMBODIMENTS

Figure 1:
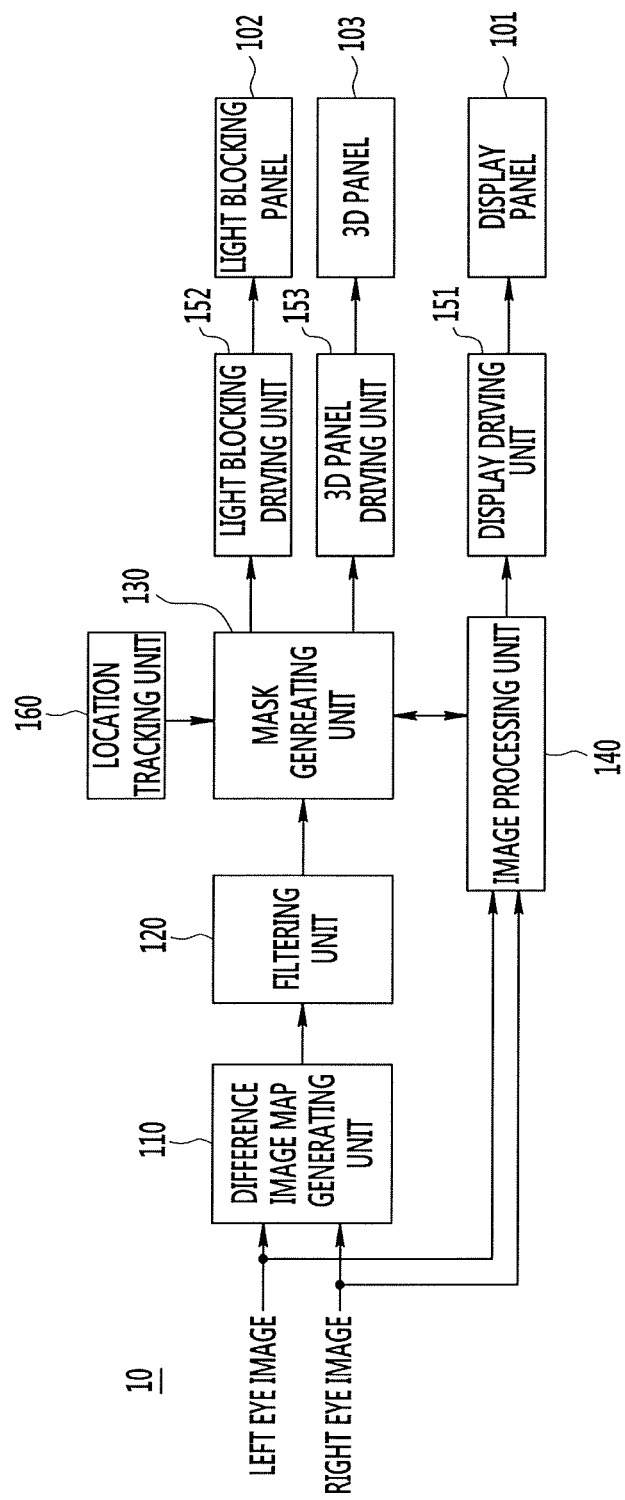
FIG. 1 is a schematic block diagram of a display device according to an exemplary embodiment of the present disclosure.

In the following detailed description, exemplary embodiments of the present disclosure are shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals may designate like elements throughout the specification.

In an exemplary embodiment of the present disclosure, as described hereinafter below, a 3D mask for partial 3D driving is generated from a difference image map between a left eye image and a right eye image, based on which a 3D panel is controlled in units of blocks corresponding one or more pixels, whereby stereoscopic vision is generated in a region of an image in which a 3D object is displayed, thus preventing distortion in the other region of the image by the 3D panel.

Also, in an exemplary embodiment of the present disclosure, a light blocking panel is controlled in units of blocks on the basis of the 3D mask, whereby a background region of a display panel in which a 3D object is displayed is adjusted to be opaque to more visibly highlight the 3D object.

Hereinafter, a display device according to an exemplary embodiment of the present disclosure will be described in detail with reference to the relevant drawings.

Figure 2:
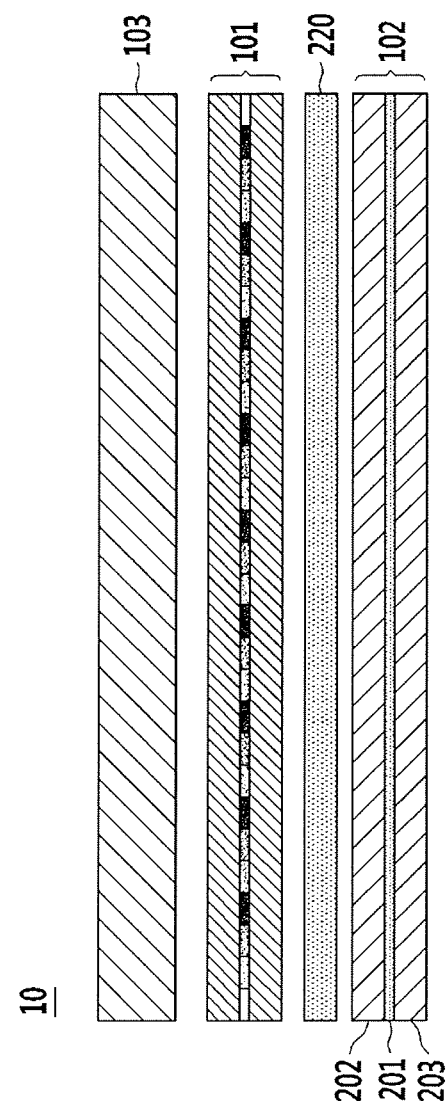
FIG. 2 is a schematic cross-sectional view of a display device according to an exemplary embodiment of the present disclosure.

FIG. 1 is a schematic block diagram of a display device according to an exemplary embodiment of the present disclosure. FIG. 2 is a schematic cross-sectional view of a display device according to an exemplary embodiment of the present disclosure.

Referring to FIGS. 1 and 2, a display device 10 may include a display panel 101, a light blocking panel 102, a 3D panel 103, a difference image map generating unit 110, a filtering unit 120, a mask generating unit 130, an image processing unit 140, a display driving unit 151, a light blocking driving unit 152, a 3D panel driving unit 153, etc. The display device 10 may further include a location tracking unit 160. The components illustrated in FIG. 1 are exemplary and non-limiting, and a display device in other exemplary embodiments may have greater or fewer components.

The display panel 101 may be a transparent display panel that can display an image processed by the image processing unit 140.

A transparent display panel maintains transparency at a level at which an object positioned at the rear of the display panel 101 may be perceived as being in front of the display panel 101 in a state in which an image is not displayed. Also, even in a state in which an image is displayed, a transparent display panel maintains a predetermined level of transparency.

The display panel 101 may be one of various flat panel display panels, such as a liquid crystal display (LCD) panel, a thin film transistor liquid crystal display (TFT-LCD) panel, a field emission display (FED) panel, or an organic light emitting diode (OLED) display panel.

If the display panel 101 requires a separate light source, such as an LCD panel, the display device 10 may further include a backlight unit 220 disposed at the rear of the display panel 101.

The backlight unit 220 may be a transparent backlight unit so that an object at the rear of the display device 10 may be perceived as being in front of the display device 10.

To minimize distortion of a background image of the display device 10 due to the backlight unit 220, the backlight unit 220 may be implemented as an edge-type backlight unit. An edge-type backlight unit 220 guides light irradiated from a light source disposed on the side to a display region, such as a liquid crystal layer, of the display panel 101 using a scattering pattern, nanoparticles, etc, of a transparent light guide plate (LGP).

If the display panel 101 does not require a backlight unit, such as an organic light emitting display panel, the backlight unit 220 may be omitted.

A light blocking panel 102 may be disposed at the rear of the display panel 101. If the display device 10 includes a backlight unit 220, the light blocking panel 102 may be disposed at the rear of the backlight unit 220.

The light blocking panel 102 may be a switchable optical shutter panel whose transparency (or light transmittance) is controlled in units of blocks corresponding one or more pixels of the display panel 101, which allows a rear (or background) image of the display device 10 to partially pass therethrough, or be blocked.

The light blocking panel 102 includes a light blocking layer 201 disposed between substrates 202 and 203 formed of a transparent material. Transparency of the light blocking panel 102 is partially adjusted by the light blocking layer 201. The transmittance of the light blocking layer 201 may be substantially continuously adjusted from being turned off to being turned on through a plurality of intermediate gray level by electrodes having a matrix structure, or an active element, in units of blocks to adjust transparency in units of blocks.

In a region of the light blocking panel 102 in which the light blocking layer 201 is maintained to be transparent, a background image, also known as a rear image, of the light blocking panel 102 passes through the light blocking layer 201 as is so as to be perceived by the user. In a region of the light blocking panel 102 in which the light blocking layer 201 is maintained to be opaque, a rear image of the light blocking panel 102 is blocked by the light blocking layer 201.

The light blocking layer 201 may include a material whose transparency may be adjusted by an applied electrical signal or voltage, such as a liquid crystal or an electrochromic material. A liquid crystal is an organic compound having properties intermediate between a liquid and a crystal in a certain temperature range, and whose color or transparency may vary due to, temperature, applied voltage, etc. An electrochromic material is a material whose color or transparency may vary due to an oxidation/reduction reaction caused by a voltage application. The light blocking layer 201 may also be implemented using an electrowetting element.

Figure 3:
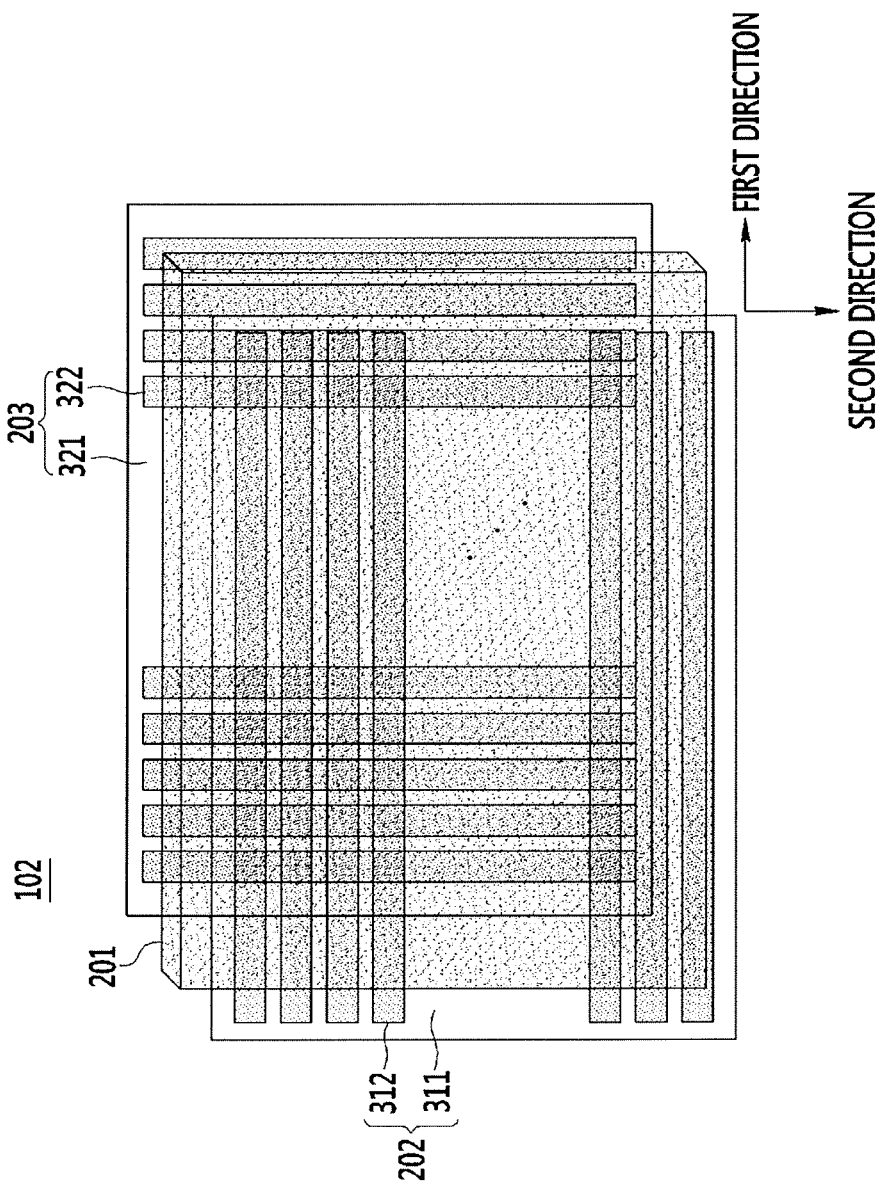
FIG. 3 illustrates an example of a light blocking panel according to an exemplary embodiment of the present disclosure.

FIG. 3 illustrates a non-limiting example where the light blocking layer 201 of the light blocking panel 102 is a liquid crystal layer.

Referring to FIG. 3, the light blocking panel 102 includes first and second substrates 202 and 203, and a liquid crystal layer 201 is provided between the first and second substrates 202 and 203.

The first substrate 202 includes a first base substrate 311 and a plurality of first electrodes 312 disposed on the first base substrate 311 spaced apart from one another and extending in a first direction.

The second substrate 203 includes a second base substrate 321 and a plurality of second electrodes 322 disposed on the second base substrate spaced apart from one another and extending in a second direction crossing the first direction.

The first and second base substrates 311 and 312 may be formed of a transparent material that transmits light.

The first and second electrodes 312 and 322 are transparent electrodes that can transmit light. For example, the first and second electrodes 312 and 322 may be formed from a transparent conductor such as indium tin oxide (ITO), indium zinc oxide (IZO), etc.

When an electrical signal or voltage is applied to the liquid crystal layer 201 through the first and second electrodes 312 and 322, transparency of the liquid crystal layer 201 may be adjusted accordingly. That is, liquid crystal molecules present in the liquid crystal layer 201 between the first and second substrates 202 and 203 rotate according to a voltage difference between the first and second electrodes 312 and 322 corresponding to each other, thus adjusting transparency of the liquid crystal layer 201.

The first and second electrodes 312 and 322 are arranged to be substantially perpendicular to each other in a matrix structure, repeatedly forming cross points. A voltage is applied to the liquid crystal layer 201 in units of blocks defined by the cross points between the first and second electrodes 312 and 322, and transparency of the liquid crystal layer 201 is adjusted in units of blocks, accordingly.

FIG. 3 illustrates an exemplary case where the light blocking panel 102 operates according to a passive matrix scheme in which transparency of the liquid crystal layer 201 is adjusted by applying electric signals to the mutually intersecting electrodes, but embodiments of the present disclosure are not limited thereto. In some exemplary embodiments, the light blocking panel 102 may be driven according to an active matrix scheme by adjusting transparency of the liquid crystal layer 201 using a plurality of active elements.

If the light blocking layer 201 is formed of nematic liquid crystal, the light blocking panel 102 may further include a polarizer above the first substrate 202 or below the second substrate 203 for optical modulation.

Referring back to FIGS. 1 and 2, the 3D panel 103 is disposed on a front surface (front side) of the display panel 101.

The 3D panel 103 may be a switchable 3D panel including an element, such as a barrier or lens, that can convert at least a portion of a display image output from the display panel 101 into 3D through generation of viewpoint disparity, in which the elements for generating viewpoint disparity can be activated or deactivated in units of blocks.

Binocular disparity refers to the difference in image location of an object seen by the left and right eyes of a human being (or user). When an image seen by the left eye and an image seen by the right eye are combined in the brain of a user, the combined image may be perceived by a user as a three dimensional (3D) image. Hereinafter, a phenomenon in which the user perceives a three-dimensional effect due to binocular disparity will be referred to as "stereoscopic vision" and an image perceivable in three dimensions will be referred to as a "3D image". In addition, if a specific object included in an image may be perceived in three dimensions, the corresponding object will be referred to as a "3D object".

In an exemplary embodiment of the present disclosure, when the 3D panel 103 enables stereoscopic vision, it means that viewpoint disparity is generated with respect to an image output from the display panel 101 so that a user may perceive the image in 3D based on binocular disparity.

The 3D panel 103 includes an element that can generate viewpoint disparity such as a parallax barrier, a lenticular lens, or a microlens array.

A parallax barrier selectively blocks an image transmitted to the user's left and right eyes or allows the image to pass therethrough, generating viewpoint disparity. A lenticular lens or a lens array such as a microlens array generates viewpoint disparity by using optical discrimination directivity.

Hereinafter, a method of generating 3D images in the 3D panel 103 will be described with reference to FIGS. 4A and 4B.

FIGS. 4A and 4B illustrate a method of implementing stereoscopic vision in a 3D panel according to an exemplary embodiment of the present disclosure.

Referring to FIG. 4A, the 3D panel 103 may include a parallax barrier 410 as an element for generating viewpoint disparity.

The parallax barrier 410 is positioned between left and right eyes 401 and 402 and a display plane 420 in which pixels L to be input to the left eye 401 and pixels R to be input to the right eye 402 are alternately disposed in a horizontal direction. The parallax barrier 410 divides the images so that the images may be separately observed by the left eye 401 and the right eye 402 through apertures having a vertical lattice shape. Thus, a user's brain may combine the image seen through the left eye 401 and the image seen through the right eye 402 to perceive a 3D image.

If a stereoscopic (3D) image is to be displayed, the parallax barrier 410 is turned on to divide the images, and if a planar image (2D) is to be displayed, the parallax barrier 410 may be turned off to allow the image to pass therethrough as is, without being divided.

Referring to FIG. 4B, the 3D panel 103 may include a lens array 430 as an element for generating viewpoint disparity.

The lens array 430 is positioned between left and right eyes 401 and 402 and the display plane 420 in which pixels L to be input to the left eye 401, referred to as left eye pixels, and pixels R to be input to the right eye 402, referred to as right eye pixels, are alternately arranged in a horizontal direction, and provides optical discrimination directivity regarding the left eye pixels L and the right eye pixels R. Thus, an image passing through the lens array 430 may be separately perceived by the left eye 401 and the right eye 402, and the user's brain may combine the image from the left eye 401 and the image from the right eye 402 to perceive a 3D image.

If the 3D panel 103 includes the lens array 430, the lens array 430 may be a gradient index (GRIN) lens, a liquid crystal Fresnel lens, a curved liquid crystal lens, or a polarization converting lens.

In a 3D panel 103 according to an exemplary embodiment of the present disclosure, the element (barrier or lens array) for generating viewpoint disparity may be activated or deactivated in units of blocks. Thus, in the 3D panel 103, only a portion of an image output from the display panel 101 may be modulated to 3D.

Hereinafter, a method for implementing partial 3D in the 3D panel 103 will be described with reference to FIGS. 5, 6A, and 6B.

FIG. 5 illustrates a case in which a 3D panel is a parallax barrier as an example according to an exemplary embodiment of the present disclosure.

Referring to FIG. 5, the 3D panel 103 includes a first substrate 520 and a second substrate 530, and a liquid crystal layer 510 is provided between the first and second substrates 520 and 530.

The first substrate 520 includes a first base substrate 521 and a plurality of first electrodes 522 disposed on the first base substrate 521 spaced apart from one another and extending in a first direction.

The second substrate 530 includes a second base substrate 531 and a plurality of second electrodes 532 disposed on the second base substrate 531 spaced apart from one another and extending in a second direction.

The first and second base substrates 521 and 532 are formed of a transparent material that can transmit light.

The first and second electrodes 522 and 532 are transparent electrodes that can transmit light. For example, the first and second electrodes 522 and 532 may be formed from indium tin oxide (ITO), indium zinc oxide (IZO), etc.

Transparency of the liquid crystal layer 510 may be adjusted by an electrical signal or voltage applied to the first and second electrodes 522 and 523 to form a parallax barrier. That is, a voltage difference between corresponding first and second electrodes 522 and 532 in the 3D panel 103 rotates liquid crystal molecules present in the liquid crystal layer 510 between the first and second substrates 520 and 530 to adjust transparency of the liquid crystal layer 510, thus realizing a barrier.

The first and second electrodes 522 and 532 are arranged substantially perpendicular to each other in a matrix structure, repeatedly forming cross points, whereby a voltage may be applied in units of blocks defined by cross points between the first and second electrodes 522 and 532. Thus, transparency of the liquid crystal layer 510 in the 3D panel 103 may be adjusted in units of blocks, allowing for ON/OFF (or activation/deactivation) of the parallax barrier in units of blocks.

FIG. 5 illustrates a non-limiting example where the 3D panel 103 operates according to a passive matrix scheme of adjusting transparency of the liquid crystal layer 201 by applying electric signals to the mutually intersecting electrodes, but embodiments of the present disclosure are not limited thereto. In other embodiments, the 3D panel 103 may be driven according to an active matrix scheme in which transparency of the liquid crystal layer 201 is adjusted using an active element.

Figure 6A:
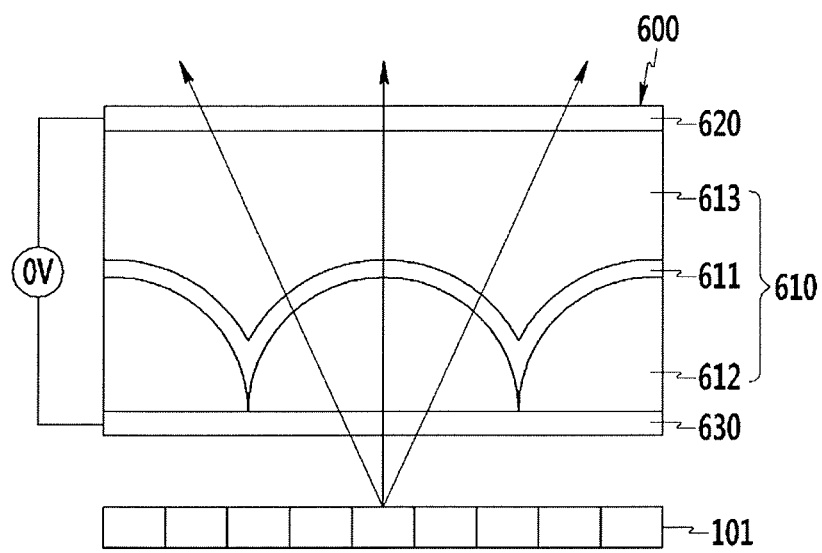
FIGS. 6A and 6B illustrate an operation when a 3D panel is a curved liquid crystal lens array according to an exemplary embodiment of the present disclosure.
Figure 6B:
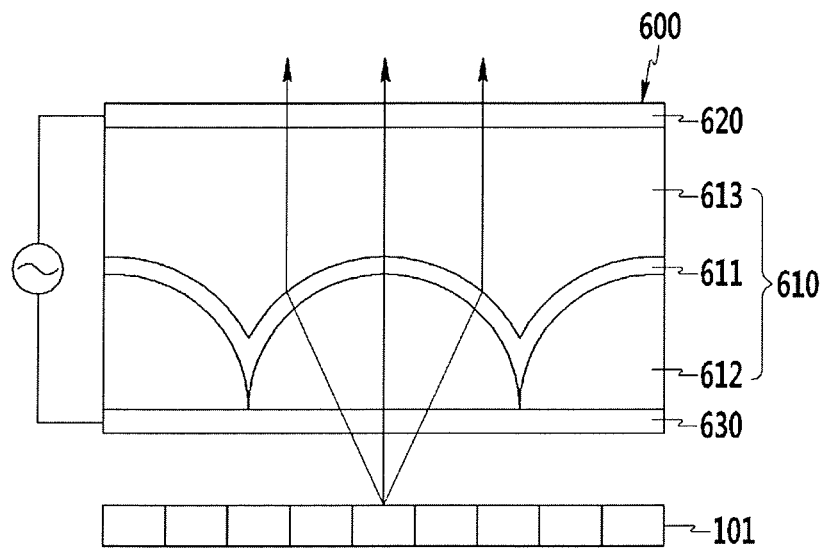

FIGS. 6A and 6B illustrate an operation when the 3D panel 103 is a curved liquid crystal lens array. FIG. 6A illustrates a light transmission direction of the lens array when no voltage is applied, and FIG. 6B illustrates a light transmission direction of the lens array when a voltage is applied.

Referring to FIGS. 6A and 6B, a curved liquid crystal lens array 600 includes first and second substrates 620 and 630, and a microlens array 610 provided between the first and second substrates 620 and 630.

The microlens array 610 includes a frame 611 having a lens shape and formed of polyimide, a liquid crystal 612 filling the interior or a lower portion of the frame 611, and a replica 613 formed outside or in an upper portion of the frame 611. The replica 613 may be formed of a material having the same refractive index as that of the liquid crystal 612 in a state in which no power is applied.

The first and second substrates 620 and 630 include a plurality of transparent electrodes facing one another. The transparent electrodes formed on the first and second substrates 620 and 630 may intersect one another and a voltage may be applied such that the microlens array 610 is driven in units of blocks.

Referring to FIG. 6A, in a state in which no voltage is applied to the transparent electrodes on the first and second substrates 620 and 630, the liquid crystal 612 and the replica 613 of the microlens array 610 have the same refractive index, and thus, light incident from the display panel 101 passes therethrough as is.

Referring to FIG. 6B, when a voltage is applied to the transparent electrodes on the first and second substrates 620 and 630, the liquid crystal 612 is activated, and thus, the liquid crystal 612 and the replica 613 of the microlens array 610 have different refractive indices. Thus, light incident from the display panel 101 is refracted or modulated, and viewpoint disparity is generated due to the refracted light.

Referring back to FIG. 1, the difference image map generating unit 110 generates a difference image map from externally received left and right eye images. The difference image map generating unit 110 calculates a difference value between corresponding pixel values in the left eye image and the right eye image, and generates a difference image map using the same.

The difference image map is a matrix of numerical values. Numerical values included in the difference image map correspond to a difference between pixel values, or an absolute value of a difference between pixel values, corresponding to the left eye image and the right eye image. In the difference image map, positions of the numerical values correspond to positions of the pixels of the display image output from the display panel 101, and relative positions of the numerical values correspond to relative positions between the corresponding pixels in the matrix.

The difference image map generated by the difference image map generating unit 110 may be output to a filtering unit 120.

The filtering unit 120 cancels noise from the difference image map and outputs a noise-canceled difference image map. The filtering unit 120 cancels noise from the difference image map by removing values included in the difference image map that are equal to or less than a threshold value. That is, the filtering unit 120 performs filtering by removing values included in the difference image map equal to or less than a threshold value or by changing the value to a predetermined value, such as "0".

In the difference image map, as a greater numerical value corresponds to a region having a greater 3D effect, and a smaller numerical value corresponds to a region having a smaller 3D effect. Thus, the filtering unit 120 filters numerical values in the difference image map that are equal to or less than the threshold value so that an image of a region having a smaller 3D effect is displayed as a 2D image.

The noise-canceled difference image map is output to the mask generating unit 130.

FIG. 1 illustrates a non-limiting example in which the display device 10 includes the filtering unit 120 for canceling noise from the difference image map generated by the difference image map generating unit 110, but the embodiments of the present disclosure are not limited thereto. In other embodiments, the difference image map generated by the difference image map generating unit 110 may be directly transmitted to the mask generating unit 130. Hereinafter, the term "difference image map" may also refer to a noise-canceled difference image map.

When the difference image map is received by the mask generating unit 130, the mask generating unit 130 generates a mask for the 3D panel 103, hereinafter, referred to as a "3D mask", and a mask for the light blocking panel 102, hereinafter, referred to as a "blocking mask", from the received difference image map.

The 3D mask is a matrix of numerical values. In the 3D mask, positions of the numerical values correspond to positions of the blocks in the 3D panel 103, and relative positions of the numerical values correspond to relative positions between the corresponding blocks in the matrix. In the 3D mask, the numerical values indicate whether 3D conversion has been performed, i.e., whether viewpoint disparity has occurred, in the corresponding blocks. That is, in the 3D mask, the numerical values indicate activation/deactivation of each element (barrier or lens) that performs 3D conversion in units of blocks in the 3D panel 103.

In an exemplary embodiment, the mask generating unit 130 may detect numerical values in the difference image map that are greater than a threshold value, and can write a value (e.g., "1") indicating activation of 3D conversion into positions corresponding to the numerical values, thus generating a 3D mask. Also, in the 3D mask, the mask generating unit 130 writes a value (e.g., "0") indicating deactivation of 3D conversion into a position corresponding to a numerical value in the difference image map equal to or less than the threshold value.

In another exemplary embodiment, the mask generating unit 130 may detect an edge portion of a 3D region from the difference image map. The mask generating unit 130 detects a 3D region in the 3D mask on the basis of a detected edge portion of the 3D region. The mask generating unit 130 writes a value indicating activation of 3D conversion into the 3D region, and writes a value indicating deactivation of 3D conversion into the other region, thus generating 3D mask.

Figure 7:
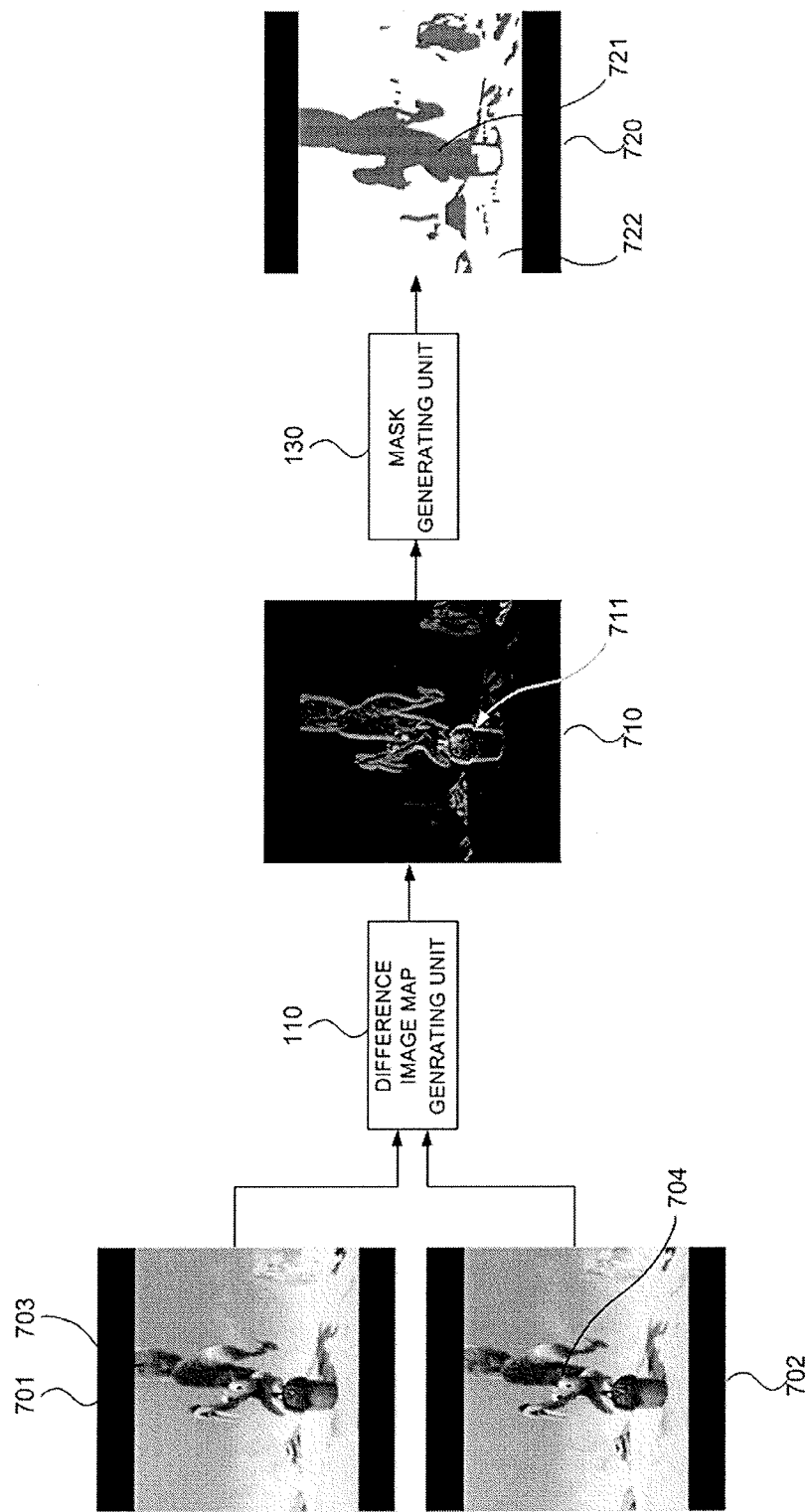
FIG. 7 illustrates an example of generating a mask for a 3D panel in a display device according to an exemplary embodiment of the present disclosure.

For example, as illustrated in FIG. 7, a difference image map 710 can be generated from a left eye image 701 and a right eye image 702 by the difference image map generating unit 110. In the difference image map 710, numerical values greater than those of other regions are detected in an edge portion 711 of a region corresponding to the 3D objects 703 and 704. Thus, the mask generating unit 130 may detect the edge portion 711 corresponding to the display region of the 3D objects 703 and 704 from the numerical values included in the difference image map 710 that are greater than the threshold value. When the edge portion 711 is detected in the difference image map 710, the mask generating unit 130 obtains a 3D region on the basis of the detected edge portion 711 to generate a 3D mask 720. In the 3D mask 720, the mask generating unit 130 writes numerical values indicating activation of 3D conversion into the 3D region 721 and writes numerical values indicating deactivation of 3D conversion into the other remaining region 722, thus generating a 3D mask 720.

When the 3D mask is generated, the mask generating unit 130 outputs the generated 3D mask to a 3D panel driving unit 153.

The 3D panel driving unit 153 drives the 3D panel 103 on the basis of the 3D mask received from the mask generating unit 130. That is, the 3D panel driving unit 153 controls activation of the 3D conversion element (barrier or lens) in each block of the 3D panel 103 on the basis of the numerical values included in the 3D mask.

The 3D panel driving unit 153 activates the element (barrier or lens) that generates viewpoint disparity to enable stereoscopic vision in the blocks corresponding to the 3D region of the 3D mask in the 3D panel. Also, the 3D panel driving unit 153 deactivates the element (barrier or lens) that generates viewpoint disparity to disable stereoscopic vision in the blocks not corresponding to the 3D region of the 3D mask in the 3D panel 103.

Accordingly, since the 3D panel 103 activates the element (barrier or lens) for generating viewpoint disparity only in the regions corresponding to the 3D object in the image output from the display panel 101, a background in the remaining region, other than the 3D object, may be prevented from being distorted by the 3D panel 103.

When a 3D mask is generated, the mask generating unit 130 also generates a blocking mask for the light blocking panel 102 on the basis of the generated 3D mask.

The blocking mask is a matrix of numerical values. In the blocking mask, positions of the numerical values correspond to positions of blocks of the light blocking panel 102, and relative positions of the numerical values correspond to relative positions between the corresponding blocks in the matrix. In the blocking mask, the numerical values indicate whether light is blocked in the corresponding blocks.

The mask generating unit 130 obtains a light blocking region in the blocking mask according to a 3D region of the 3D mask. In addition, the mask generating unit 130 writes a value (i.e., "1") indicating light blocking or opaqueness into a light blocking region of the blocking mask and writes a value (e.g., "0") indicating light transmission or transparency into the other remaining region, thus generating a blocking mask.

The mask generating unit 130 may obtain a light blocking region of the blocking mask from the 3D region of the 3D mask on the basis of a position relationship between the 3D panel 103 and the light blocking panel 102 or between the display panel 101 and the light blocking panel 102.

The mask generating unit 130 may detect a location of a user and correct the light blocking region of the blocking mask based on a direction of user's eyes and the detected user location. That is, the mask generating unit 130 may adjust the position of the light blocking region of the blocking mask according to a viewpoint of the user.

The mask generating unit 130 receives the user location information from a location tracking unit 160. The user location information may include a distance between the user and the display device 10 and a horizontal position indicating a position of the display plane to which the user's eyes correspond. Let a virtual linear line extend from the location point of the user's eyes to be perpendicular to the display plane of the display device 10, then the horizontal position may include coordinates of the point at which the virtual linear line intersects the display plane.

The location tracking unit 160 may include a camera, and can obtain user location information from an image obtained by the camera of the user.

Figure 8A:
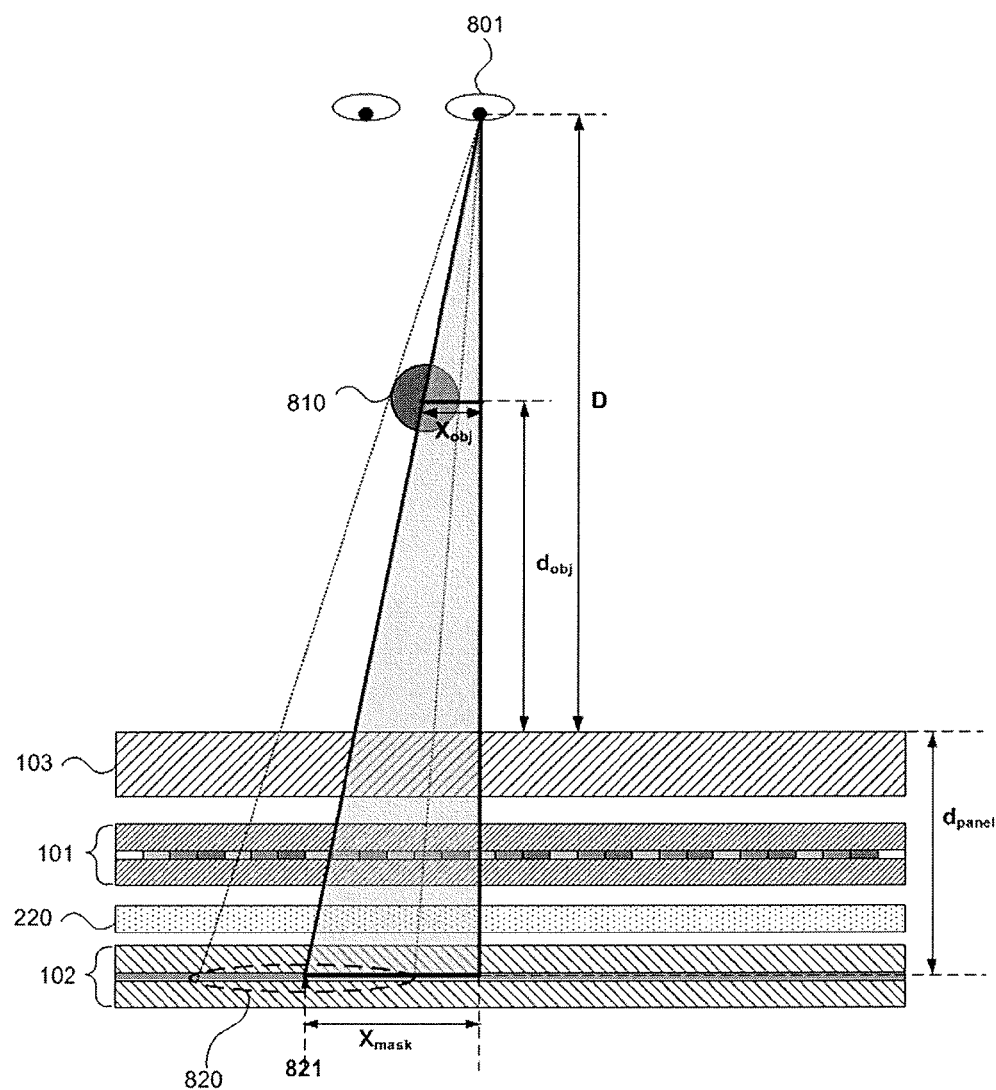
FIGS. 8A and 8B illustrate a method for generating a mask for a light blocking panel according to an exemplary embodiment of the present disclosure.

Referring to FIG. 8A, when the user location information is obtained, the mask generating unit 130 may obtain a position $x_{mask}$ of the light blocking region as expressed by Equation 1 below on the basis of the obtained user location information.

$(D-d_{obj}):x_{obj}=(D+d_{panel}):x_{mask}$ $x_{mask}=x_{obj}\times(D+d_{panel})/(D-d_{obj})$ [Equation 1]

In Equation 1, D denotes a distance between the display device and the user, and $d_{obj}$ denotes a depth of the 3D object 810 in the 3D image. $x_{obj}$ denotes a horizontal position of the 3D object 810 in the 3D image with respect to the location of the user's left eye 801

$x_{mask}$ denotes a position of a central point 821 in the light blocking region 820 with respect to the location of the user's left eye 801.

$d_{obj}$ and $x_{obj}$ may be obtained from an image processing unit 140. The image processing unit 140 may synthesize the left eye image and the right eye image to generate a display image for the display panel 101, and extract the depth $d_{obj}$ and the position $x_{obj}$ of the 3D object 810 in the 3D image from the display image.

With reference to Equation 1, the position $x_{mask}$ of the central point 821 of the blocking region 820 is obtained by scaling the position $x_{obj}$ of the 3D object 810 in the 3D image by the ratio of a distance $(D-d_{obj})$ between the user and the 3D object 810 and a distance $(D+d_{panel})$ between the user and the light blocking panel 102.

Figure 8B:
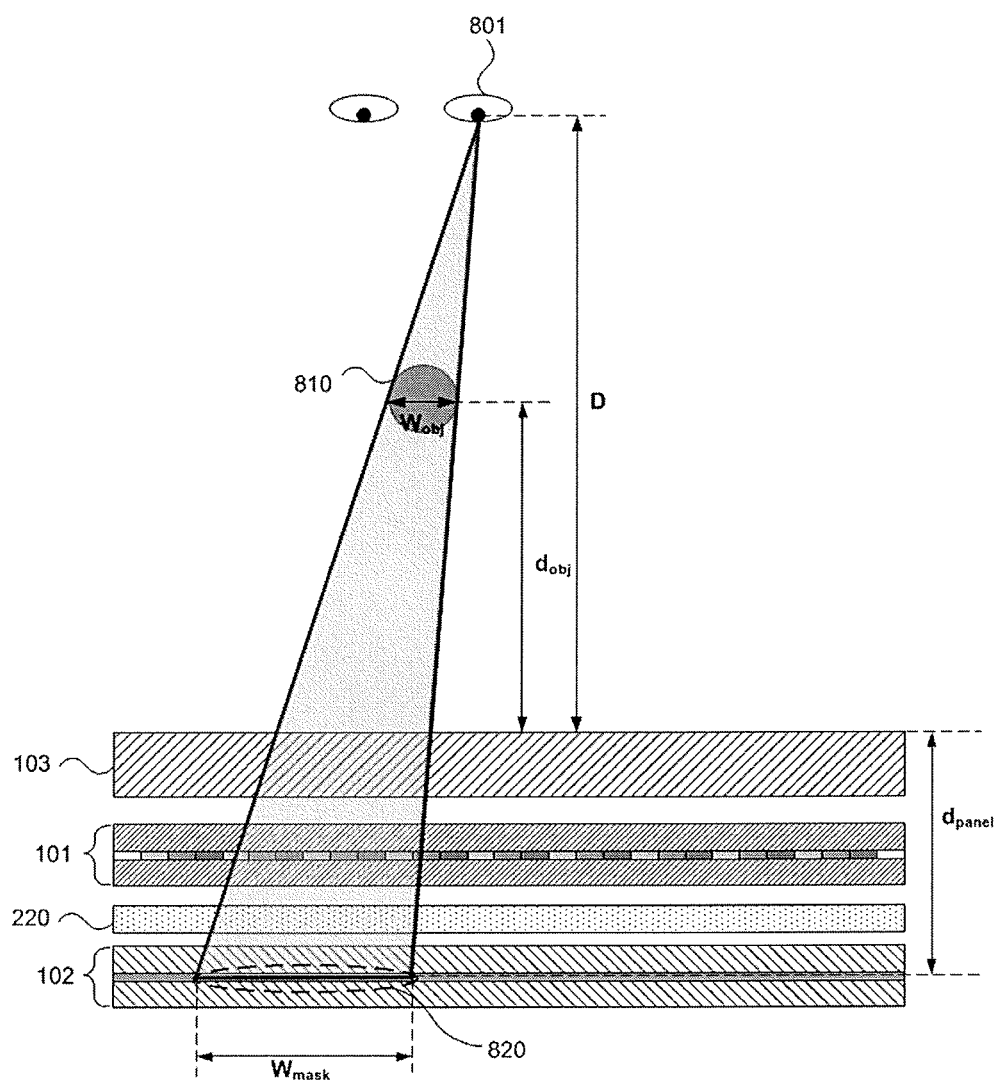

Referring to FIG. 8B, the mask generating unit 130 may obtain a size $W_{mask}$ of the light blocking region as expressed by Equation 2 below on the basis of the user location information.

$(D-d_{obj}):W_{obj}=(D+d_{panel}):W_{mask}$ $W_{mask}=W_{obj}\times(D+d_{panel})/(D-d_{obj})$ [Equation 2]

In Equation 2, $W_{obj}$ denotes a size (width) of the 3D object 810 in the 3D image and may be obtained by the image processing unit 140. The image processing unit 140 may synthesize the left eye image and the right eye image to generate a display image for the display panel 101, and extract the size $W_{obj}$ of the 3D object in the 3D image from the display image.

In Equation 2, $W_{mask}$ denotes a size (width) of the light blocking region 820.

Referring to Equation 2, the size $W_{mask}$ of the light blocking region 820 is obtained by scaling the size $W_{obj}$ of the 3D object 810 in the 3D image by the ratio of a distance $(D-d_{obj})$ between the user and the 3d object 810 and a distance $(D+d_{panel})$ between the user and the light blocking panel 102.

FIGS. 8A and 8B illustrate a method for determining a position and a size of the light blocking region 820 seen by the user's left eye 801, and the same method may be applied to the blocking mask seen by the use's right eye.

As described above, when a position and a size of the light blocking region are determined on the basis of the user location information, the mask generating unit 130 sets numerical values in the blocking mask on that basis. That is, the mask generating unit 130 writes a value indicating light blocking (opaqueness) into the light blocking region of the blocking mask and writes a value indicating light transmission (transparency) into the other remaining region.

The mask generating unit 130 outputs the blocking mask to a light blocking driving unit 152.

The light blocking driving unit 152 drives the light blocking panel 102 on the basis of the blocking mask received from the mask generating unit 130. That is, the light blocking driving unit 152 controls transparency of each block of the light blocking panel 102 on the basis of the numerical values in the blocking mask.

With regard to the blocks of the light blocking panel 102 that correspond to the light blocking region of the blocking mask, the light blocking driving unit 152 may lower transparency of the corresponding region of the light blocking layer 201 of FIG. 2 to be opaque. Similarly, with regard to the blocks of the light blocking panel 102 which do not correspond to a light blocking region, the light blocking driving unit 152 may maintain or increase the transparency of corresponding region of the light blocking layer 201.

As described above, a background region of a 3D object in the light blocking panel 102 is adjusted to be opaque. Thus, a background in the remaining regions, excluding the region in which the 3D object is displayed in the display device 10, is transmitted to the user to be visible without being blocked, and only the background of the 3D object is processed to be opaque, to highlight the 3D object.

Also, the opaqueness of the background region of the 3D object may be adjusted according to the user's view to better highlight the 3D object regardless of user location.

Referring back to FIG. 1, the image processing unit 140 receives the left eye image and the right eye image and generates an image from the left eye image and the right eye image, hereinafter, referred to as a "display image", to be output through the display panel 101.

The image processing unit 140 determines a 3D display region and a 2D display region in the display image on the basis of the 3D mask received from the mask generating unit 130. The 3D display region corresponds to a region of the 3D panel 103 in which the element (barrier or lens) for generating viewpoint disparity is activated to enable stereoscopic vision, and the 2D display region corresponds to a region of the 3D panel 103 in which the element (barrier or lens) for generating viewpoint disparity is deactivated so that the image may pass therethrough as is.

Regarding the 3D display region, the image processing unit 140 generates an interlaced image in which the left eye image pixels and the right eye image pixels corresponding to the region are alternately arranged in a horizontal direction. Regarding the 2D display region, the image processing unit 140 generates a 2D image without interlacing. The 2D image may be generated from either the left eye image or the right eye image, or may be generated using by synthesizing the left eye image and the right eye image.

The image processing unit 140 generates a partial 3D image as a display image to be output through the display panel 101 by combining (or integrating) the interlaced image for the 3D display region and the 2D image for the 2D display region.

However, when the interlaced portion of the image output through the display panel 101 passes through the 3D panel 103, luminance of the interlaced image is reduced, compared with the 2D image.

Thus, in an exemplary embodiment of the present disclosure, luminance of each pixel forming the interlaced image is increased, compared with the pixels of the 2D image.

In some exemplary embodiments, in the display device 10, luminance of each pixel in the interlaced image is increased by using a backlight unit driving unit to increase brightness of the backlight unit 220 in the region corresponding to the 3D display region.

In another exemplary embodiment, in the display device 10, luminance of each pixel in the interlaced image is increased by using the display driving unit 151 to increase brightness of each pixel of the region corresponding to the 3D display region.

The display image generated in the image processing unit 140 is output to the display driving unit 151.

When the display image is generated by the image processing unit 140, the display driving unit 151 controls the display panel 101 to be synchronized with horizontal and vertical synchronization signals to output the display image.

Figure 9:
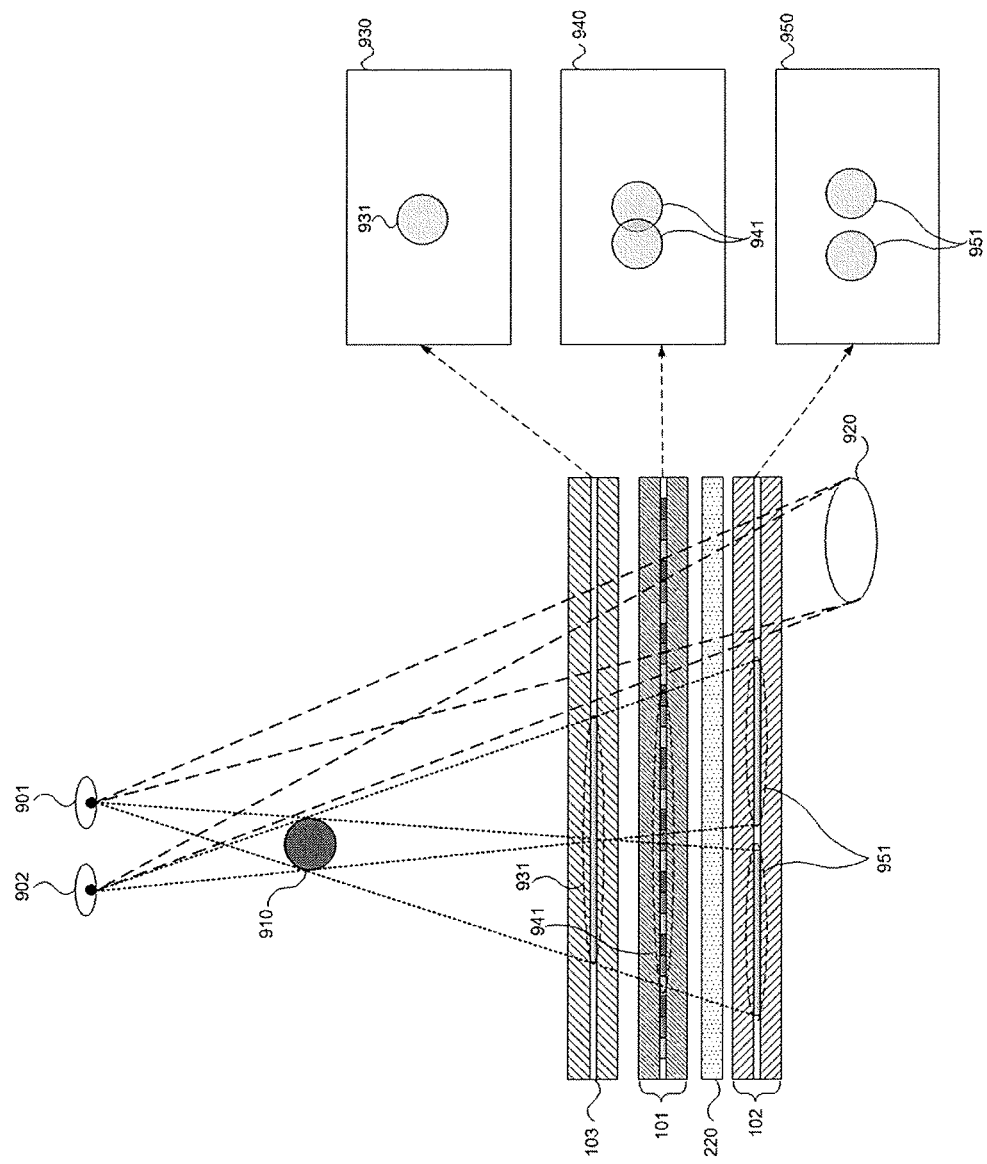
FIG. 9 illustrates a method for displaying a partial 3D image in a display device according to an exemplary embodiment of the present disclosure.

FIG. 9 illustrates a method for displaying a partial 3D image in the display device 10.

Referring to FIG. 9, the display panel 101 outputs a display image 940 as a partial 3D image. The display image 940 includes an interlaced image in a 3D display region 941 determined from a 3D mask 930 and includes a 2D image in the remaining region.

The 3D panel 103 activates the element (barrier or lens) of the 3D mask 930 for generating viewpoint disparity in blocks corresponding to the 3D region 931. Thus, only a portion of the display image 940 displayed in the 3D display region 941 is converted by the 3D panel 103 and perceived as a 3D object 910 by the user's eyes 901 and 902.

The light blocking panel 102 adjusts transparency of the blocks of the blocking mask 950 corresponding to the blocking region 951 to be opaque. Thus, a background of the 3D object 910 is perceived as opaque by the user's eyes 901 and 902, and the 3D object 910 is highlighted to be visible. In addition, an image of an object 920 outside the background image of the 3D object 910 may pass through the display device 10 undistorted by the light blocking panel 102 or the 3D panel 103, to be perceived by the user's eyes 901 and 902.

In an exemplary embodiment, the difference image map generating unit 110, the filtering unit 120, the mask generating unit 130, and the image processing unit 140 may be implemented as different application specific integrated circuits (ASICs).

In another exemplary embodiment, a single ASIC may be used to implement all the functions of the difference image map generating unit 110, the filtering unit 120, the mask generating unit 130, and the image processing unit 140.

Also, in another exemplary embodiment, a field programmable gate array (FPGA) may be programmed to perform functions of the difference image map generating unit 110, the filtering unit 120, the mask generating unit 130, and the image processing unit 140.

Also, in another exemplary embodiment, a general purpose processor such as an advanced RISC machine, such as an ARM processor, etc., may be programmed to perform each function of the difference image map generating unit 110, the filtering unit 120, the mask generating unit 130, and the image processing unit 140.

Figure 10:
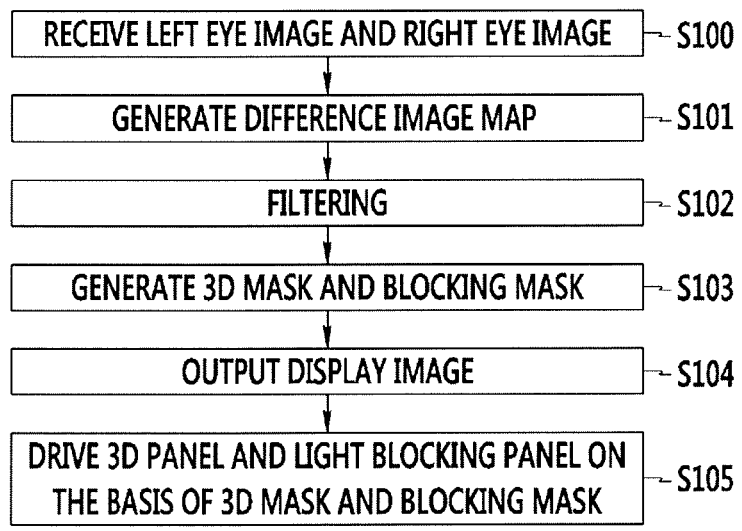
FIG. 10 is a flow chart illustrating a method of controlling a display device according to an exemplary embodiment of the present disclosure.

FIG. 10 is a flow chart illustrating a method of controlling a display device according to an exemplary embodiment of the present disclosure.

Referring to FIG. 10, the display device 10 according to an exemplary embodiment of the present disclosure receives a left eye image and a right eye image from an external source (S100). The display device 10 generates a difference image map from the received left eye image and the right eye image (S101).

In step S101, the display device 10 calculates a difference between corresponding pixel values of the left eye image and the right eye image, and generates a difference image map using the calculated difference values. The difference image map may be optionally filtered to reduce noise at step S102 by removing those values of the difference image map less than a predetermined threshold.

The display device 10 generates a 3D mask for the 3D panel 103 and a blocking mask for the light blocking panel 102 from the difference image map in step S103.

In step S103, the 3D mask is a matrix of numerical values, and each numerical value of the 3D mask indicates activation/deactivation of an element (barrier or lens) of the 3D panel 103 for generating viewpoint disparity in each block. The display device 10 determines a 3D region in the 3D mask from the difference image map. The display device 10 writes a value into the 3D region indicating activation of the element (barrier or lens) for generating viewpoint disparity and writes a value into the remaining region indicating deactivation of the element (barrier or lens) for generating viewpoint disparity, to generate a 3D mask.

In step S103, the blocking mask is a matrix of numerical values, and each numerical value of the blocking mask indicates the transparency or opaqueness in each block of the light blocking panel 102. The display device 10 determines a light blocking region in the blocking mask from the 3D mask. The display device 10 writes a value into the light blocking region indicating light blocking (opaqueness) of the corresponding blocks and writes a value into the remaining region indicating light transmission (transparency) of the corresponding blocks, to generate a blocking mask.

The display device 10 generates a display image from the left eye image and the right eye image received in step S100, and outputs the generated display image through the display panel 101 at step S104.

In step S104, the display device 10 determines a 3D display region and a 2D display region in the display image on the basis of the 3D mask generated in step S103. In addition, the display device 10 generates an interlaced image in the 3D display region in which left eye image pixels and right eye image pixels are alternately arranged, and generates a non-interlaced 2D image in the 2D display region.

When the display image is output, the display device 10 drives the 3D panel 103 and the light blocking panel 102 at step S105 based on the 3D mask and the blocking mask generated in step S103. That is, on the basis of the 3D mask and the blocking mask, the 3D panel of the display device 10 converts the interlaced 3D image portion in the display image into a 3D image and the light blocking panel 102 converts the background portion of the display image to be opaque.

As described above, in exemplary embodiments of the present disclosure, stereoscopic vision can be generated in regions in which a 3D object is displayed, thereby preventing other regions of the image from being distorted by the 3D panel. Also, since a viewpoint disparity generation region is a part of the image, rather than the entire image, luminance reduction in a viewpoint disparity generation process may be minimized, which may reduce the power consumed for compensating for the luminance reduction.

Also, in exemplary embodiments of the present disclosure, a background of a region in which a 3D object is displayed in the display panel is adjusted to be opaque, thus highlighting the 3D object to be more visible.

While embodiments of this disclosure have been described in connection with what is presently considered to be practical exemplary embodiments, it is to be understood that embodiments of the disclosure are not limited to the disclosed exemplary embodiments, but, on the contrary, are intended to cover various modifications and equivalent arrangements included within the spirit and scope of the appended claims.

What is claimed is:

1. A display device comprising:
a light blocking panel having an adjustable transparency and configured to block light or allow light to pass therethrough;
a transparent display panel disposed on the light blocking panel and configured to output a display image;
a three-dimensional (3D) panel disposed on the transparent display panel and configured to generate viewpoint disparity to generate a 3D effect in at least a portion of the display image, wherein the light blocking panel and the 3D panel are each organized into a plurality of blocks corresponding one or more pixels;
a mask generating unit configured to generate a first mask from a difference image map generated from a left eye image and a right eye image that indicates whether or not viewpoint disparity is generated in each block of the 3D panel, and to generate a second mask from the first mask that indicates whether each block of the light blocking panel is transparent or opaque; and
an image processing unit configured to generate the display image from the left eye image, the right eye image and the first mask, wherein the display image is divided into a first region and a second region on the basis of the first mask, wherein the first region includes an interlaced image generated by alternately arranging left eye image pixels and right eye image pixels, and the second region includes a 2D image generated from one or both of the left eye image and the right eye image.

2. The display device of claim 1, wherein the light blocking panel includes:
first and second substrates formed of a transparent material; and
a light blocking layer provided between the first and second substrates and having an adjustable transparency for each block, wherein
the first substrate includes a plurality of first electrodes disposed thereon that are spaced apart from one another and extend in a first direction,
the second substrate includes a plurality of second electrodes disposed thereon that are spaced apart from one another and extend in a second direction intersecting the first direction, and
transparency of the light blocking layer is adjusted according to each block by voltages applied to the first electrodes and the second electrodes.

3. The display device of claim 2, wherein:
the light blocking layer includes a liquid crystal or an electrochromic material.

4. The display device of claim 1, wherein:
the 3D panel includes a liquid crystal layer having an adjustable transparency, wherein transparency of the liquid crystal layer is adjusted according to each block, and
a barrier for generating viewpoint disparity is activated or deactivated for each block by the liquid crystal layer.

5. The display device of claim 1, wherein:
the 3D panel includes
a first substrate including a plurality of first electrodes disposed thereon that are spaced apart from one another and extend in a first direction,
a second substrate including a plurality of second electrodes disposed thereon that are spaced apart from one another and extend in a second direction intersecting the first direction, and
a lens array provided between the first and second substrates,
wherein each lens of the lens array is activated or deactivated according to a voltage applied to the corresponding first electrode and second electrode.

6. The display device of claim 1, further comprising:
a difference image map generating unit configured to generate the difference image map from differences between corresponding pixel values of the left eye image and the right eye image.

7. The display device of claim 6, further comprising:
a filtering unit configured to remove values from the difference image map that are equal to or less than a threshold value and output the same to the mask generating unit.

8. The display device of claim 1, wherein:
the mask generating unit receives user location information and determines a position and a size of an opaque block in the second mask on the basis of the location information.

9. The display device of claim 8, wherein:
the mask generating unit determines a position of the opaque block from a position of a 3D object in the display image from a ratio of a distance between the 3D object corresponding to the interlaced image and the user and a distance between the user and the light blocking panel.

10. The display device of claim 8, wherein:
the mask generating unit determines a size of the opaque block from a size of the 3D object in the display image from a ratio of the distance between the 3D object corresponding to the interlaced image and the user and the distance between the user and the light blocking panel.

11. The display device of claim 1, further comprising:
a backlight unit configured to irradiate light to the display panel,
wherein the backlight unit outputs light such that brightness of a region corresponding to the interlaced image is stronger than brightness of a region corresponding to the 2D image.

12. The display device of claim 1, further comprising:
a 3D panel driving unit configured to drive the 3D panel to generate viewpoint disparity in the interlaced image of the display image on the basis of the first mask and to allow the 2D image to pass therethrough as is;
a light blocking driving unit configured to control a background region of the interlaced image to be opaque in the light blocking panel on the basis of the second mask; and
a display driving unit configured to drive the display panel,
wherein the display driving unit drives the display panel such that brightness of pixels corresponding to the interlaced image increases relative to brightness of pixels of the region corresponding to the 2D image.

13. A method of controlling a display device, comprising the steps of:
receiving a left eye image and a right eye image;
generating a difference image map from the received left eye image and the right eye by calculating a difference between corresponding pixel values of the left eye image and the right eye image;
generating a 3D mask for a 3D panel from the difference image map, wherein the 3D mask is a matrix of numerical values, each indicating activation/deactivation of an element of the 3D panel for generating viewpoint disparity in each block of the 3D panel;
generating a blocking mask for the light blocking panel from the difference image map, wherein the blocking mask is a matrix of numerical values, each indicating a transparency or opaqueness in each block of a light blocking panel;
generating a display image from the left eye image, the right eye image, and the 3D mask by generating an interlaced image portion in a 3D display region of the display image in which left eye image pixels and right eye image pixels are alternately arranged, and generating a non-interlaced 2D image in a 2D display region of the display image, and outputting the generated display image through a display panel; and
driving the 3D panel and the light blocking panel based on the 3D mask and the blocking mask wherein the 3D panel converts the interlaced image portion in the display image into a 3D image and the light blocking panel converts the non-interlaced 2D image of the display image to be opaque.

14. The method of claim 13, further comprising filtering the difference image map by removing those values of the difference image map less than a predetermined threshold.

15. A display device comprising:
a light blocking panel having an adjustable transparency and configured to block light or allow light to pass therethrough;
a three-dimensional (3D) panel disposed on the transparent display panel and configured to viewpoint disparity to generate a 3D effect in at least a portion of a display image, wherein the light blocking panel and the 3D panel are each organized into a plurality of blocks corresponding one or more pixels;
a difference image map generating unit configured to generate a difference image map from differences between corresponding pixel values of a left eye image and a right eye image;
a mask generating unit configured to generate a first mask from the difference image map that indicates whether or not viewpoint disparity is generated in each block of the 3D panel, and to generate a second mask from the first mask that indicates whether each block of the light blocking panel is transparent or opaque; and
an image processing unit configured to generate the display image from the left eye image, the right eye image and the first mask, wherein the display image is divided into a first region and a second region on the basis of the first mask, the first region includes an interlaced image generated by alternately arranging left eye image pixels and right eye image pixels, and the second region includes a 2D image generated from one or both of the left eye image and the right eye image.

16. The display device of claim 15, wherein:
the light blocking panel includes:
a first substrate formed of a transparent material that includes a plurality of first electrodes disposed thereon that are spaced apart from one another and extend in a first direction;
a second substrate formed of a transparent material that includes a plurality of second electrodes disposed thereon that are spaced apart from one another and extend in a second direction intersecting the first direction; and
a light blocking layer provided between the first and second substrates and having an adjustable transparency for each block, wherein transparency of the light blocking layer is adjusted according to each block by voltages applied to the first electrodes and the second electrodes.

17. The display device of claim 15, wherein the 3D panel includes a liquid crystal layer having an adjustable transparency,
wherein transparency of the liquid crystal layer is adjusted according to each block, and a barrier for generating viewpoint disparity is activated or deactivated for each block by the liquid crystal layer.

18. The display device of claim 15, wherein the 3D panel includes:
a first substrate including a plurality of first electrodes disposed thereon that are spaced apart from one another and extend in a first direction,
a second substrate including a plurality of second electrodes disposed thereon that are spaced apart from one another and extend in a second direction intersecting the first direction, and
a lens array provided between the first and second substrates,
wherein each lens of the lens array is activated or deactivated according to a voltage applied to the corresponding first electrode and second electrode.

19. The display device of claim 15, wherein:
the mask generating unit receives user location information, including a position and a size of a 3D object in the display image,
determines a distance of an opaque block from the 3D object in the display image from a ratio of a distance between the 3D object corresponding to the interlaced image and the user and a distance between the user and the light blocking panel, and
determines a size of the opaque block from a size of the 3D object in the display image from a ratio of the distance between the 3D object corresponding to the interlaced image and the user and the distance between the user and the light blocking panel.

20. The display device of claim 15, further comprising:
a transparent display panel disposed on the light blocking panel and configured to output the display image;

a 3D panel driving unit configured to drive the 3D panel to generate viewpoint disparity in the interlaced image of the display image on the basis of the first mask and to allow the 2D image to pass therethrough as is;

a light blocking driving unit configured to control a background region of the interlaced image to be opaque in the light blocking panel on the basis of the second mask; and a display driving unit configured to drive the display panel, wherein the display driving unit drives the display panel such that brightness of pixels corresponding to the interlaced image increases relative to brightness of pixels of the region corresponding to the 2D image.

* * * * *